(12) United States Patent
Lezzoum et al.

(10) Patent No.: US 11,501,758 B2
(45) Date of Patent: Nov. 15, 2022

(54) ENVIRONMENT AWARE VOICE-ASSISTANT DEVICES, AND RELATED SYSTEMS AND METHODS

(71) Applicant: Apple Inc., Cupertino, CA (US)

(72) Inventors: Narimene Lezzoum, Sunnyvale, CA (US); Sylvain J. Choisel, Palo Alto, CA (US); Richard Powell, Mountain View, CA (US); Ashrith Deshpande, San Jose, CA (US); Ameya Joshi, Menlo Park, CA (US)

(73) Assignee: APPLE INC., Cupertino, CA (US)

(*) Notice: Subject to any disclaimer, the term of this patent is extended or adjusted under 35 U.S.C. 154(b) by 70 days.

(21) Appl. No.: 16/988,052

(22) Filed: Aug. 7, 2020

(65) Prior Publication Data

US 2021/0097980 A1 Apr. 1, 2021

Related U.S. Application Data

(60) Provisional application No. 62/907,246, filed on Sep. 27, 2019.

(51) Int. Cl.
*G10L 15/08* (2006.01)
*G10L 13/02* (2013.01)
(Continued)

(52) U.S. Cl.
CPC ............. *G10L 15/08* (2013.01); *G06F 3/16* (2013.01); *G10L 13/02* (2013.01); *H04R 3/04* (2013.01); *H04R 2430/01* (2013.01)

(58) Field of Classification Search
CPC .......... G10L 15/08; G10L 13/02; G06F 3/16; H04R 3/04; H04R 2430/01
See application file for complete search history.

(56) References Cited

U.S. PATENT DOCUMENTS 6,876,968 B2 4/2005 Veprek
11,114,089 B2 * 9/2021 Chapman ................ G06F 21/32
(Continued)

FOREIGN PATENT DOCUMENTS

EP 0852052 6/2001

OTHER PUBLICATIONS

Skowronski, et al. "Applied Principles of Clear and Lombard Speech for Automated Intelligibility Enhancement in Noisy Environments," Speech Communication, 2006, pp. 549-558.
(Continued)

*Primary Examiner* — Fan S Tsang
*Assistant Examiner* — David Siegel
(74) *Attorney, Agent, or Firm* — BakerHostetler

(57) ABSTRACT

An appliance can include a microphone transducer, a processor, and a memory storing instructions. The appliance is configured to receive an audio signal at the microphone transducer and to detect an utterance in the audio signal. The appliance is further configured to classify a speech mode based on the utterance. The appliance is further configured to determine conditions of an environment of the appliance. The appliance is further configured to select at least one of a playback volume or a speech output mode from a plurality of speech output modes based on the classification, and the conditions of the environment of the appliance. The appliance is further configured to adapt the playback volume and/or mode of played-back speech according to the speech output mode. The appliance may be configured to synthesize speech according to the speech output mode, or to modify synthesized speech according to the speech output mode.

26 Claims, 8 Drawing Sheets

(51) Int. Cl.
*H04R 3/04* (2006.01)
*G06F 3/16* (2006.01)

(56) References Cited

U.S. PATENT DOCUMENTS

| | | |
|---|---|---|
| 2003/0061049 A1 | 3/2003 | Erten |
| 2004/0176949 A1 | 9/2004 | Wenndt et al. |
| 2006/0126859 A1 | 6/2006 | Elberling |
| 2010/0057465 A1 | 3/2010 | Kirsch et al. |
| 2015/0088522 A1 | 3/2015 | Hendrickson et al. |
| 2016/0360372 A1 | 12/2016 | Chen et al. |
| 2017/0213549 A1 | 7/2017 | Hassani et al. |
| 2017/0358301 A1* | 12/2017 | Raitio .................... G10L 25/18 |
| 2018/0122361 A1* | 5/2018 | Silveira Ocampo .... G10L 15/02 |

OTHER PUBLICATIONS

Varadarjan, et al., "Analysis of Lombard Effect Under Different Types and Levels of Noise with Application to In-Set Speaker ID Systems," Interspeech, 2006, pp. 937-940.

Zhang, et al., "Analysis and Classification of Speech Mode: Whispered Through Shouted," Eighth Annual Conference of the International Speech Communication Association. 2289-2292.

\* cited by examiner

ENVIRONMENT AWARE VOICE-ASSISTANT DEVICES, AND RELATED SYSTEMS AND METHODS

FIELD

This application and the subject matter disclosed herein (collectively referred to as the "disclosure"), generally concern voice-assistant devices, including those capable of synthesized speech playback, and related systems and methods. More particularly, but not exclusively, this disclosure pertains to systems, methods, and components that adapt synthesized speech or playback of synthesized speech to cues observed in a listening environment, as to improve intelligibility of the synthesized speech and a user's experience.

BACKGROUND INFORMATION

Audio appliances are increasingly able to perform a number of tasks in response to commands uttered by a user and generally have made interacting with machines, such as, for example, smart speakers, computers, mobile devices, navigation systems, automobiles, and other computing environments, more natural than, for example, using tactile or keyed input. In principle, such appliances acquire sound from an acoustic scene, extract information (e.g., a command) from the acquired sound, and respond to the extracted information.

When such an audio appliance performs a task, a result of the task may include text, which can be synthesized into speech by the audio appliance. The synthesized speech can be output for the user, e.g., through a loudspeaker, providing a user-perceptible output. Various conditions associated with the user's listening environment and aspects of the synthesized speech may negatively affect a user-perceived quality, or intelligibility, of the synthesized speech.

As used herein, the term "intelligibility" refers to a measure of perceptual quality of sound containing speech, e.g., a measure of whether or to what extent the speech is audible to and understandable by a listener. Intelligibility of a given sound output may vary across different listening environments.

SUMMARY

Concepts, systems, methods, and apparatus disclosed herein pertain to synthesizing speech, or modifying already-synthesized speech, according to acoustic and non-acoustic cues reflecting characteristics of a user's listening environment. Such cues can include, among other things, characteristics of a user's speech used to invoke a voice assistant. For example, when an audio appliance is in a noisy environment, a user's utterance used to invoke a voice assistant may exhibit the so-called "Lombard effect." In response, the audio appliance may synthesize speech (or modify synthesized speech) to exhibit characteristics of the Lombard effect, improving intelligibility of the synthesized speech in that environment.

In some respects, disclosed concepts concern improving intelligibility of previously synthesized speech in accordance with observed characteristics of a listening environment. Such characteristics can include, for example, a user's intonation and speaking tempo, as well as other observable characteristics of a user's speaking mode. These and other characteristics of a listening environment can include direct or indirect observations of reverberation, background noise, speech quality, a distance to the person speaking, and so forth. Still other characteristics, including non-acoustic cues, suggestive of a user's listening environment can include, for example, a time of day, a volume setting on an audio appliance, and a location of the audio appliance.

Some disclosed concepts pertain to systems, methods, and components to synthesize speech that is intelligible in the listening environment in which the speech is played. For example, some disclosed audio appliances may use selected cues suggestive of the environment to select a model or parameters used to synthesize speech tailored to a given listening environment.

According to one aspect, an audio appliance has an audio acquisition module having a microphone transducer and being configured to receive an audio signal. The appliance also includes one or more other functional components. For example, the appliance can include a speech classifier configured to classify a speech mode of a received utterance. As well, the appliance has a decision component configured to identify conditions associated with a listening environment, and to select a speech output mode from a plurality of speech output modes. The audio appliance also has an output component configured to output synthesized speech according to the speech output mode.

The decision component may select one or more speech synthesis parameters corresponding to the speech output mode. The decision component may also, or alternatively, select a playback volume. The one or more speech-synthesis parameters, when incorporated in a speech-synthesis model, can cause a speech mode of the synthesized speech to match the speech mode of the utterance. In other cases, the one or more speech-synthesis parameters, when incorporated in a speech-synthesis model, can cause a speech mode of the synthesized speech to differ from the speech mode of the utterance. In some cases, the decision component may select a speech synthesis model from a plurality of speech synthesis models corresponding to the speech output mode.

The audio appliance also has a speech synthesizer configured to synthesize speech. Such synthesis may include selecting a speech synthesis model from a plurality of speech synthesis models, selecting one or more speech synthesis parameters that can be applied to a given speech synthesis model, or both, according to the selected speech output mode, a selected playback volume, or both.

The speech synthesizer can be configured to receive one or more speech synthesis parameters and text that is to be synthesized into speech. The synthesizer can also be configured to provide the one or more speech synthesizer parameters and the text as input to the speech synthesis model. The synthesizer can be configured to generate synthesized speech from the text with the speech synthesis model, e.g., according to the one or more speech synthesis parameters. The appliance can have an output component configured to output the synthesized speech.

In some cases, the decision component may select one or more speech modification parameters corresponding to the speech output mode. The audio appliance may also have a speech modification component configured to modify synthesized speech according to the selected one or more speech modification parameters, according to a selected playback volume, or both, prior to outputting the modified synthesized speech.

The speech classifier may be configured to classify a speech mode of the utterance as a whisper mode, a normal mode, or a Lombard-effect mode. For example, the speech classifier may be configured to classify the speech mode of the utterance as a whisper mode, a normal mode, or a Lombard effect mode according to at least one of: a pitch, an energy content, a number of formant, a spectral tilt, a speech rate, or a combination thereof.

The conditions associated with a listening environment that the decision component is configured to identify may include at least one of: an acoustic cue deduced from the audio signal, a non-acoustic cue, or combination thereof. An acoustic cue may include at least one of: background noise received by the microphone transducer, a direct to reverberant ratio, a signal to noise ratio, an echo coupling residual, a distance to the person speaking, a speech quality metric, characteristics of the room, or combination thereof. A non-acoustic cue may include at least one of: a time of day, a location type, an appliance mode, a user profile, a location layout, and an acoustic profile of a location.

The output component may include a loudspeaker and a digital signal processing component configured to process synthesized speech for output by the loudspeaker.

The appliance can include an input processor configured to receive the audio signal from the microphone transducer, to process the audio signal, and to invoke a speech-recognition task with respect to the processed audio signal. The received text can correspond to a response generated according to the speech-recognition task.

The appliance can include one or more additional microphone transducers positioned at one or more locations on the audio appliance. The one or more additional microphone transducers can be configured to receive sound and provide a corresponding audio signal to the input processor.

In still other respects, concepts disclosed herein may concern appliances having a microphone transducer, a processor, and a memory storing instructions. The instructions may, when executed by the processor, cause the appliance to receive an audio signal at the microphone transducer. The instructions may further cause the appliance to detect an utterance in the audio signal, and to analyze the utterance to classify a speech mode based on the utterance. The instructions may further cause the appliance to determine conditions associated with the listening environment. For example, the conditions may include one or more acoustic cues from the audio signal, and one or more non-acoustic cues, wherein each non-acoustic cue corresponds to a condition of an environment of the appliance. The instructions may further cause the appliance to select a speech output mode from a plurality of speech output modes based on the classification, the one or more acoustic cues, and the one or more non-acoustic cues. Additionally or alternatively, the instructions may cause the appliance to select a playback volume, e.g., of synthesized speech. The instructions may further cause the appliance to output synthesized speech according to the speech output mode, the selected playback volume, or both.

Some instructions can cause the appliance to classify the utterance according to one or more characteristics of the utterance to classify the speech mode. The characteristics may include, for example and without limitation, a pitch, a number of formants, a spectral tilt, a speech rate, an energy content, or combination thereof. The instructions may cause the appliance to classify the speech mode of the utterance as a whisper mode, a normal mode, or a Lombard effect mode according to the one or more characteristics.

Some instructions can cause the appliance to receive the audio signal from the microphone transducer and process the audio signal. The instructions can further cause the appliance to request speech recognition on the processed audio signal. Responsive to requesting speech recognition, the appliance may receive text, which may correspond to a response generated based on recognized speech.

The instructions can further cause the appliance to synthesize the text into speech. In some cases, the instructions can cause the appliance to synthesize the text into speech according to the speech output mode. For example, the instructions can cause the appliance to select one or more speech synthesis parameters, and to generate synthesized speech according to a speech synthesis model and the selected one or more speech synthesis parameters. In another example, the instructions can cause the appliance to select a speech synthesis model from a plurality of speech synthesis models, and to generate synthesized speech according to the selected speech synthesis model.

In other cases, the instructions can cause the appliance to modify the synthesized speech according to the speech output mode. For example, the instructions can cause the appliance to select one or more speech modification parameters based on speech output mode, and to modify the synthesized speech according to the one or more speech modification parameters and to output the modified synthesized speech. According to another aspect, the instructions can cause the appliance to modify the volume of the speech playback according to the acoustic cues of the environment, e.g., independently of the speech synthesizer.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

Figure 1:
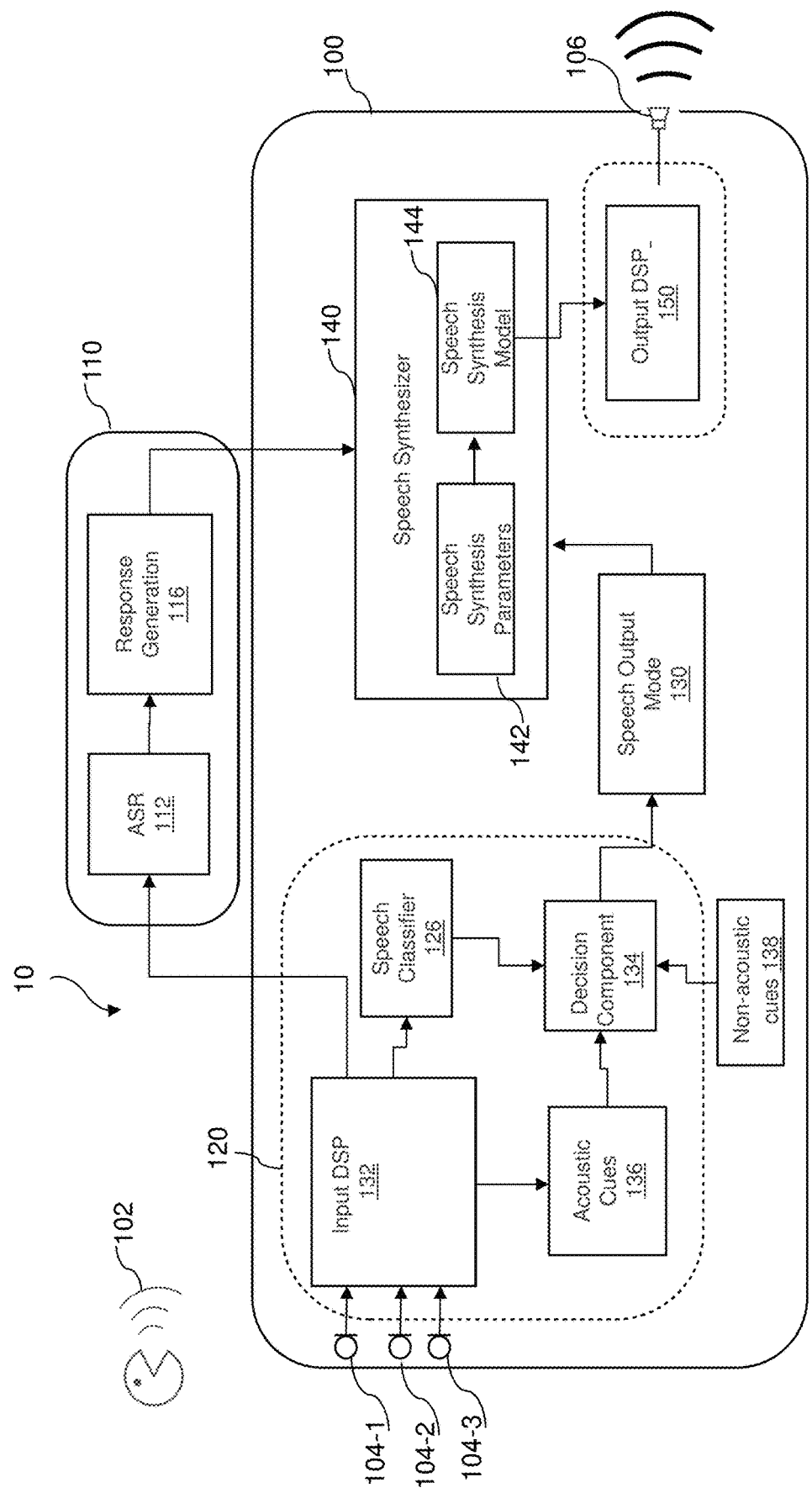
FIG. 1 illustrates a schematic block diagram of a first system for adapting the playback of voice-assistant devices to the environment.

The following describes various principles related to adapting synthesized speech or playback of synthesized speech to cues observed in a user's listening environment. In one aspect, the disclosed principles select synthesized speech modifications to improve intelligibility in the listening environment. As but one illustrative example, an audio appliance can detect an utterance, classify a speech mode based on characteristics of the utterance, and identify conditions present in and associated with a listening environment. Based on the observed characteristics, the audio appliance can adapt the synthesis of speech, modify synthesized speech, and/or change a playback volume. Such modifications can make the output of synthesized speech intelligible in challenging environments, comfortable to listen to in other environments, or generate a whispered speech in quiet and specific environments, each of which can improve a user's experience across different listening environments.

In one aspect, certain aspects of disclosed principles pertain to classifying a user's utterance. For example, the classification can proceed according to a plurality of speech modes and detected or identified conditions associated with a user's listening environment. Synthesized speech can be generated, or previously generated synthesized speech can be modified, according to the speech mode and the environment conditions to achieve a desired level of intelligibility. For example, the synthesized speech may be modified linearly, as by increasing or decreasing its level/volume, or modified with advanced signal processing techniques (e.g., in the temporal and spectral domain), as to mimic a whisper or Lombard-effect speech, as described below. That said, descriptions herein of specific apparatus configurations and combinations of method acts are but particular examples of contemplated systems chosen as being convenient illustrative examples of disclosed principles. One or more of the disclosed principles can be incorporated in various other systems to achieve any of a variety of corresponding system characteristics.

Thus, systems having attributes that are different from those specific examples discussed herein can embody one or more presently disclosed principles, and can be used in applications not described herein in detail. Accordingly, such alternative aspects also fall within the scope of this disclosure.

I. Overview

An approach to improving perceived intelligibility and comfort of synthesized speech can consider characteristics of a user's speech, as well as acoustic and non-acoustic cues indicative of the user's listening environment. For example, those characteristics and cues may indicate that a given listening environment is noisy or quiet. Such indications can be used to infer conditions around an audio appliance such as a specific location or room layout, a class of room, or a time of day.

Disclosed principles can be implemented to affect attributes of synthesized speech, e.g., during synthesis or after synthesis, to make the output of the synthesized speech intelligible to a user within a given, observed listening environment. Similarly, disclosed principles can be implemented to affect attributes of synthesized speech to make the output appropriate for a user's listening environment while making the output intelligible. For example, in a quiet environment, the output synthesized speech may be whispered by an audio appliance. In a loud environment, the output synthesized speech may be loud enough to be heard over the background noise, while differing from normal speech in ways that make the speech more intelligible, as discussed below.

In some cases, adjusting the volume or level of the output speech may be sufficient to maintain comfort and intelligibility of the speech. That said, additional or alternative approaches for adapting speech to an observed listening environment also are described to improve a user experience, e.g., as by improving speech intelligibility.

Approaches to adapt synthesized speech and/or speech playback can include detecting conditions (or characteristics) associated with a given listening environment, such as, without limitation, a background noise level, an acoustic map of a room, and/or a time of day. The approaches may also, or alternatively, detect characteristics of a user's speech mode, e.g., a whisper, a stage whisper, a "normal" voice, a loud, projecting voice, or a shout. Detected conditions and the user's speech mode can be input to a decision component, which decides on a playback volume, a speech output mode for outputting synthesized speech, or both. The selected speech output mode may determine how speech is synthesized, or how synthesized speech is modified, prior to output to the user, such that the output synthesized speech is perceptually more intelligible, comfortable, and adequate to a user's listening environment. Consequently, the intelligibility of the output synthesized speech is preserved or improved in a way other than merely changing the volume of the speech or in addition to changing the volume of the speech. In some cases, the speech mode of the user may be matched by the synthesized speech, while in other cases, the speech mode of the output synthesized speech may differ from the user's speech mode.

Further details of disclosed principles are set forth below. Section II discusses different aspects and modes of human speech. Section III describes principles pertaining to one approach, where the decision component may select one or more speech synthesis parameters that, when applied by a speech synthesizer, may change the way a speech synthesis model generates synthesized speech, when compared to a "normal" output. Section IV describes principles pertaining to a different approach, where the decision component may select a specific speech synthesis model from a plurality of speech synthesis models for the speech synthesizer to use. Section V describes principles pertaining to still another approach, where the decision component may select one or more speech modification parameters, a volume mapping, or speech modification parameters and a volume mapping, that a speech modification component may use to modify already-synthesized speech to improve intelligibility of the synthesized speech in the listening environment and/or to adapt the playback to the environment by increasing or decreasing the volume. Section VI discloses various examples of control logic that may be used in the disclosed approaches. And, Section VII discloses principles related to audio appliances and computing environments suitable for implementing disclosed improvements to synthesized speech intelligibility technologies.

Other, related principles also are disclosed. For example, the following describes machine-readable media containing instructions that, when executed, cause a processor of, e.g., a computing environment, to perform one or more disclosed methods. Such instructions can be embedded in software, firmware, or hardware. In addition, disclosed methods and techniques can be carried out in a variety of forms of processor or controller, as in software, firmware, or hardware.

II. Speech Modes

Human speech can be characterized by one or more measures. Examples of these measures include, without limitation, pitch, level or energy content, spectral tilt, speech rate, and formants. Pitch refers to the relative highness or lowness of a tone as perceived by the ear. For a human speaker, pitch depends on the number of vibrations per second produced by the speaker's vocal cords. Pitch may be measured (or quantified) by frequency. A given speaker may produce a range of pitches.

Energy content in a sound field, e.g., in speech, is related to the sound pressure, particle velocity and density of the medium through which the sound propagates. Energy content can be quantified with units of energy, e.g., Joules. Sound level, or "level," is a logarithmic ratio of energy content to a reference energy content and is usually expressed in non-dimensional units, e.g., in decibels (dB).

Spectral tilt refers to a relationship between the speech's frequencies and the level or energy content at each frequency. When plotted, e.g., as decibels/Hertz (dB/Hz), spectral tilt is the slope of the curve. In normal human speech, higher frequencies in the speech usually have lower energy content than the lower frequencies, thus spectral tilt is generally negative over a human-vocalized frequency band.

Speech rate may refer to how slowly or quickly a person speaks, for example, as measured by words per minute (wpm). Normal speech rates may be in the range of about 120 wpm to about 200 wpm, e.g., 130 wpm, 140 wpm, 150 wpm, and 160 wpm. Speech rates may vary among different individuals depending on, for example, a speaker's culture, gender, and/or geographical location. As well, the speech rate for a given individual may vary, for example, depending on subject matter, emotional state, fluency, profession or audience.

A formant refers to a concentration of acoustic energy around a particular frequency in sound carrying an utterance and corresponds to a resonance in the vocal tract. Human speech includes several formants. Each formant occurs at a different frequency, about one in each 1,000 Hz band. That is, in human speech, formants occur at about 1,000 Hz intervals.

Compared to normal or neutral speech, whispered speech lacks pitch and has no periodic excitation of harmonic structure. Whispered speech also has formant frequencies that are higher than those in normal speech, but lacks tier formants. Whispered speech also has a flatter spectral tilt and has lower energy content than normal speech.

Lombard-effect speech, on the other hand, refers to a generally involuntary human response to speaking in noisy environments, where speech is modified to improve intelligibility. Lombard-effect speech, compared to normal speech, is characterized by an increase in pitch, a slower speech rate, and an increase in level or energy content. Lombard-effect speech also exhibits a decreased spectral tilt caused by energy content being shifted toward the higher frequencies. The energy content may also be more concentrated in the formant frequencies relative to normal speech.

As used herein, "listening environment" or "environment" refers to the location of the audio appliance into which the loudspeaker on the audio appliance will play synthesized speech to the user. Generally, the listening environment will be the same as the recording environment where the user speaks to interact with a voice assistant application on the audio appliance.

III. Example 1

FIG. 1 illustrates an example of a first system 10 for adapting playback of voice-assistant devices to an environment to preserve or improve intelligibility of synthesized or other played-back speech. The system 10 may include an audio appliance 100. The audio appliance 100 can be embodied, for example, as a computing device. In some aspects, the audio appliance is embodied as a mobile-communications device, e.g., a smartphone or tablet computer, or a personal or home assistant device, e.g., a smart speaker. The audio appliance 100 may include a voice assistant application (not shown) that is configured to listen for, understand, and respond to a user's uttered requests or commands. Alternatively, the voice assistant application may reside on a different, e.g., network-connected, device, or the voice assistant application may be distributed between or among network-connected devices.

The appliance 100 may be configured to listen for and respond to an uttered activation command, for example, with an activation component (not shown). The activation component, which may be a component in an input unit 120, may listen for an activation command in an incoming audio signal. For example, the activation component may identify utterances in the audio signal and may analyze the utterances to detect one or more specific keywords or key phrases, such as may be used to trigger the voice assistant application.

Responsive to detecting an activation command, the voice assistant application may cause the device to listen for a user utterance. On receipt of the user's utterance, the voice-assistant application can send the audio signal containing the utterance to a speech recognition component. The voice assistant application may then perform a task or respond to a request responsive to a detected command or request in the recognized speech.

The input unit 120 may include an input digital signal processor (DSP) 132. The input unit 120 may include an audio acquisition module (AAM) (not shown) having a microphone transducer, e.g., microphone 104-1, configured to capture ambient sound. The ambient sound may include a user's utterance 102. The input DSP 132 may process, filter or otherwise condition or prepare the acquired representation of ambient sound for a speech recognition task, and may also provide the resulting audio signal to a speech classifier 126. For example, the input DSP 132 may remove noise, perform echo cancellation, and remove reverberations from the audio signal(s).

The speech classifier 126 may analyze, extract, measure, or otherwise determine one or more characteristics of the utterance in order to classify a speech mode of the utterance. For example, the speech classifier may classify the speech mode as a whisper mode, a normal mode, or a Lombard-effect mode. Other modes, such as a soft mode between a whisper and normal speech, and/or a loud mode between normal speech and Lombard-effect speech, may also be identified. In one example, the speech classifier 126 may compare, for example, the pitch of the utterance to a pitch threshold or range, a spectral tilt of the utterance to a spectral tilt threshold or range, and/or an energy content of the utterance to an energy content threshold or range. If, for example, the utterance lacks pitch and/or has less energy than a threshold, the speech classifier 126 may classify the utterance as a whisper. If the spectral tilt of the utterance is flatter relative to a threshold spectral tilt, and the pitch of the utterance is higher than a pitch threshold, the speech classifier 126 may classify the utterance as Lombard-effect mode. Persons skilled in the art will appreciate that an "utterance" may include one or more words, phrases, or sentences, and may include keywords that are capable of triggering a voice assistant of the system 10. Other methods of classification may be employed. For example, the speech classifier 126 may include a neural network component that may receive information about one or more aspects of the utterance, the conditions in the environment, or a combination thereof, and then output a speech mode classification according to the received information.

Although depicted in FIG. 1 as being on the appliance 100, in some aspects the speech classifier 126 may be remote from the appliance 100. For example, the speech classifier 126 may be a component of a cloud-based speech classification system, or a component of a remote speech recognition system, e.g., a remote automatic speech recognition (ASR) system 110. Although the ASR system 110 is depicted as being remote from the device 10, some or all of the automatic speech recognition operations may be performed on the device 10. Accordingly, the ASR system 110 may be incorporated on the device 10.

The processing by the input DSP 132 may also include extracting acoustic cues 136 from the present listening environment. For example, acoustic cues 136 may be extracted from ambient sound present in the audio signals from the one or more microphones. Examples of acoustic cues may include background noise level, a direct to reverberant ratio, a signal to noise ratio, an echo coupling residual, a quality measure of the speech, an output level of audio already being played back by the appliance (e.g., music), and a distance to the human speaker.

The input unit 120 may also include a decision component 134. The decision component 134 may be configured to receive the identified speech mode from the speech classifier 126, and may receive or retrieve the acoustic cues 136. As well, the decision component may receive or retrieve other cues, e.g., non-acoustic cues 138, indicative of or associated with the listening environment or a user's preferences. The decision component 134 may identify conditions associated with the listening environment of the audio appliance based on the received and/or retrieved information.

Non-acoustic cues 138 may include information about the environment and the user's preferences that are not related to the sound in the listening environment. Examples of non-acoustic cues may include the time of day, a location of the audio appliance, e.g., in a room or in a vehicle, a type of room where the audio appliance is located, e.g., a kitchen, bedroom, or family room, a known layout of a room, or metadata related to the environment. Some audio appliances, e.g., home assistant appliances, may have an acoustic profile of the room in which they operate and may have information about distances between the various microphones the appliance has access to and a human speaker.

The decision component 134 may determine, for example, that the listening environment is a very quiet one where whispered speech is desirable. This may be determined based on, for example, receiving an indication of a whispered speech mode from the speech classifier, an acoustic cue of low levels of background noise; non-acoustic cues including a time of day of midnight, a location being a bedroom, a relatively small distance between the audio appliance and the user, e.g., less than arm's length; or any combination of these.

In another example, the decision component 134 may determine that the listening environment is a very noisy one where Lombard-effect speech and an increased volume will improve intelligibility of synthesized speech. This may be determined based on, for example, receiving an indication of a Lombard-effect speech mode from the speech classifier, an acoustic cue indicating high levels of background noise; non-acoustic cues including a time of day associated with a high-level of background noise, e.g., 7 p.m., a relatively large distance between the audio appliance and the user, e.g., farther than arm's length, a location of a living room; or any combination of these. In some aspects, when location-tracking is enabled, the decision component 134 may receive information that the audio appliance is in, for example, a restaurant or a performance venue.

The decision component 134 may select a volume for played-back speech. For example, the decision component 134 may include a neural network component that outputs a volume level based on characteristics of the user's utterance, the acoustic cues, the non-acoustic cues, or a combination thereof. For example, the decision component 134 may determine that the listening environment is moderately noisy, that the audio appliance is relatively close to the user, and that the time of day is 10 a.m., and may select a modification to the playback volume without other modifications to the played-back speech. When the decision component 134 determines that a change in volume is needed, the indicated change may be provided to a speech synthesizer 140 or to an output DSP 150.

The decision component 134 may determine a speech output mode to be used by the speech synthesizer 140 according to the determined listening environment. The decision component 134 may select a speech output mode 130 corresponding to the speech mode classified by the speech classifier. For example, selecting a speech output mode may comprise selecting one or more speech synthesis parameters 142 corresponding to the speech output mode. In some aspects, the decision component 134 may provide the selected speech synthesis parameters 142 to the speech synthesizer 140, as will be discussed further below. In other aspects the decision component 134 may, instead, provide an indication of the selected speech output mode 130 to the speech synthesizer 140. The speech synthesizer 140 may, responsive to the indication, select from among a plurality of speech synthesis parameters according to the indication. In some aspects, when the determined speech output mode corresponds to normal speech, the decision component 134 may not provide any speech synthesis parameters 142, or speech output mode, to the speech synthesizer 140.

Figure 4:
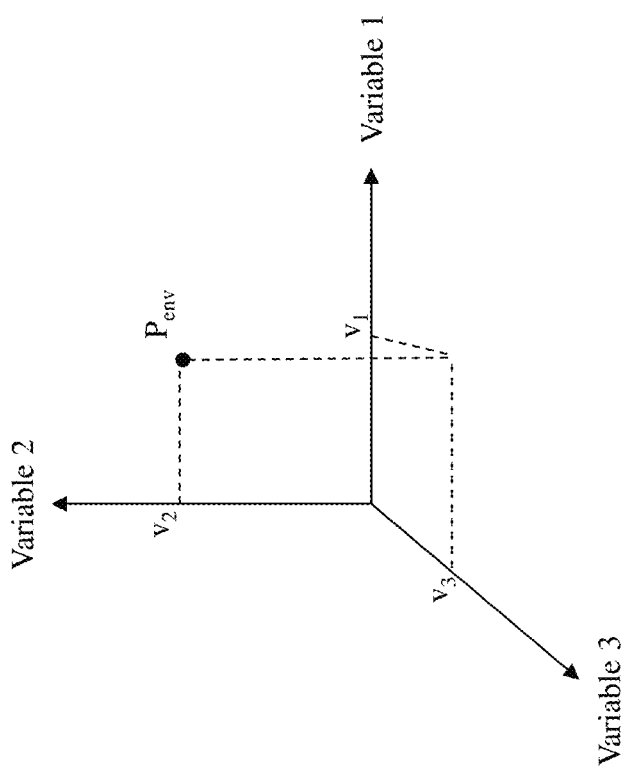
FIG. 4 illustrates an example of a relationship between environmental parameters and a class of speech.

In some cases, the decision component 134 may use one or more functions, mapping curves, look-up tables or other relationships between its inputs and the parameters to be selected for speech synthesis and/or to adapt the playback volume and mode to the environment, as will be discussed further with respect to FIG. 4. In some cases, the decision component 134 may include a neural network or other machine learning component and may be trained to select specific parameters according to various training scenarios. The decision component 134 may be capable of adjusting its training, e.g., by modifying the functions, mapping curves, look-up tables, etc. in response to receiving user feedback indicating that the output speech is not intelligible, comfortable to listen to, or adequate for that environment. For example, the user may utter "Speak up", or "I don't understand that" after hearing synthesized or other played-back speech. Such utterances may prompt the decision component 134 to select different parameters or to adjust the values of selected parameters to adapt playback and/or a mode of the speech, improving intelligibility of the output. In some cases, feedback from users of different appliances may be aggregated, for example on a remote server, and may be used to improve the decision component's operation.

The appliance 100 may be further configured to perform speech recognition tasks on utterances, e.g., utterance 102, received via one or more onboard and/or communicatively coupled microphones, e.g., microphones 104-1, 104-2, 104-3. Concurrently, or in parallel, with the decision component's operation, the input DSP 132 may be configured to transmit the prepared signal to an automatic speech recognition (ASR) system, e.g., an on-device ASR system or a remote automatic speech recognition (ASR) system 110, as by using a connection to the Internet, e.g., to a cloud-based system. The appliance 100 may perform some speech recognition (SR) tasks locally, while requesting other SR tasks from the remote ASR system. In some examples, the appliance 100 may perform all SR tasks locally, without requesting any tasks from a remote ASR system.

In some circumstances, the appliance 100 or the SR system 110 may perform a task responsive to receiving recognized speech that contains a spoken command or request. For example, an automatic speech recognition (ASR) component 112 may extract words and phrases from the received audio signal. The ASR component 112 may interpret and/or map the extracted words and phrases to a task or command. A response generation component 116 may perform the task or command and may generate or retrieve text as a result of executing the task or command. As an example, the user's utterance may be "What's the weather in Dallas today?". The response generation component 116 may look up the weather forecast for Dallas, Tex. on the current date and may retrieve or generate a text statement such as "It will be sunny in Dallas today with a high of 96 degrees."

The text from the response generation component 116 may be provided to the speech synthesizer 140. The speech synthesizer 140 may have a speech synthesis model 144 that is used to generate normal-mode speech from the text. The speech synthesizer 140 may generate an audio signal having sounds corresponding to the text. The speech synthesis model 144 may specify a value, a range of values, or a filter to apply, for one or more aspects of the synthesized speech in the audio signal. For example, one parameter may specify a pitch or range of pitches. Another parameter may specify a level or energy content for the audio signal. Another parameter may specify a speech rate. In some cases, the speech synthesizer 140 may have more than one model, for example, separate models for male and female voices, or separate models for different accents, e.g., British English, Australian English, and American English, or languages, e.g., Dutch, German, Japanese. However, these different models may all generally be designed to produce normal-mode speech.

When the speech synthesizer 140 receives speech synthesis parameters 142 from the decision component 134, the speech synthesizer 140 may use the received parameters 142 instead of corresponding parameters in the speech synthesis model 144 to synthesize speech. In some circumstances, one or more of the received parameters 142 may be used in addition to the speech synthesis model 144, for example, if the speech synthesis model 144 does not specify a value or range of values for a particular aspect of the synthesized speech. The speech synthesis parameters may include values for an aspect of the speech, such as, for example, volume, pitch, rate, and pauses between words.

In an aspect where the speech synthesizer 140 receives an indication of a speech output mode, the speech synthesizer 140 may select speech synthesis parameters, from among a plurality of speech synthesis parameters, that correspond to the indication of the speech output mode.

The speech synthesis parameters may specify the use of particular filters. For example, a frequency shaping filter may be specified to raise a level of selected frequencies above a noise level. In some cases, filters to modify phase, filters to modify pitch, filters to compress phonemes, filters to expand phonemes, filters to normalize power, or combinations thereof may be specified to improve intelligibility of the synthesized speech.

The synthesized speech may be provided to an output component comprising an output digital signal processor (DSP) 150 configured to process synthesized speech for output, and a loudspeaker 106. In some aspects, the output component may include the speech synthesizer 140.

In many cases, the speech mode of the output synthesized speech may match the speech mode classification of the utterance determined by the speech classifier 126, e.g., the output will be whispered speech when the user's utterance is whispered, or the output will be Lombard-effect speech when the user's utterance exhibits the Lombard effect. In some cases, however, the speech mode of the output synthesized speech may not match the speech mode classification of the utterance. For example, if the user speaks in a normal mode in a loud environment, the selected speech output mode 130 may be for Lombard-effect speech rather than for normal speech.

IV. Example 2

Figure 2:
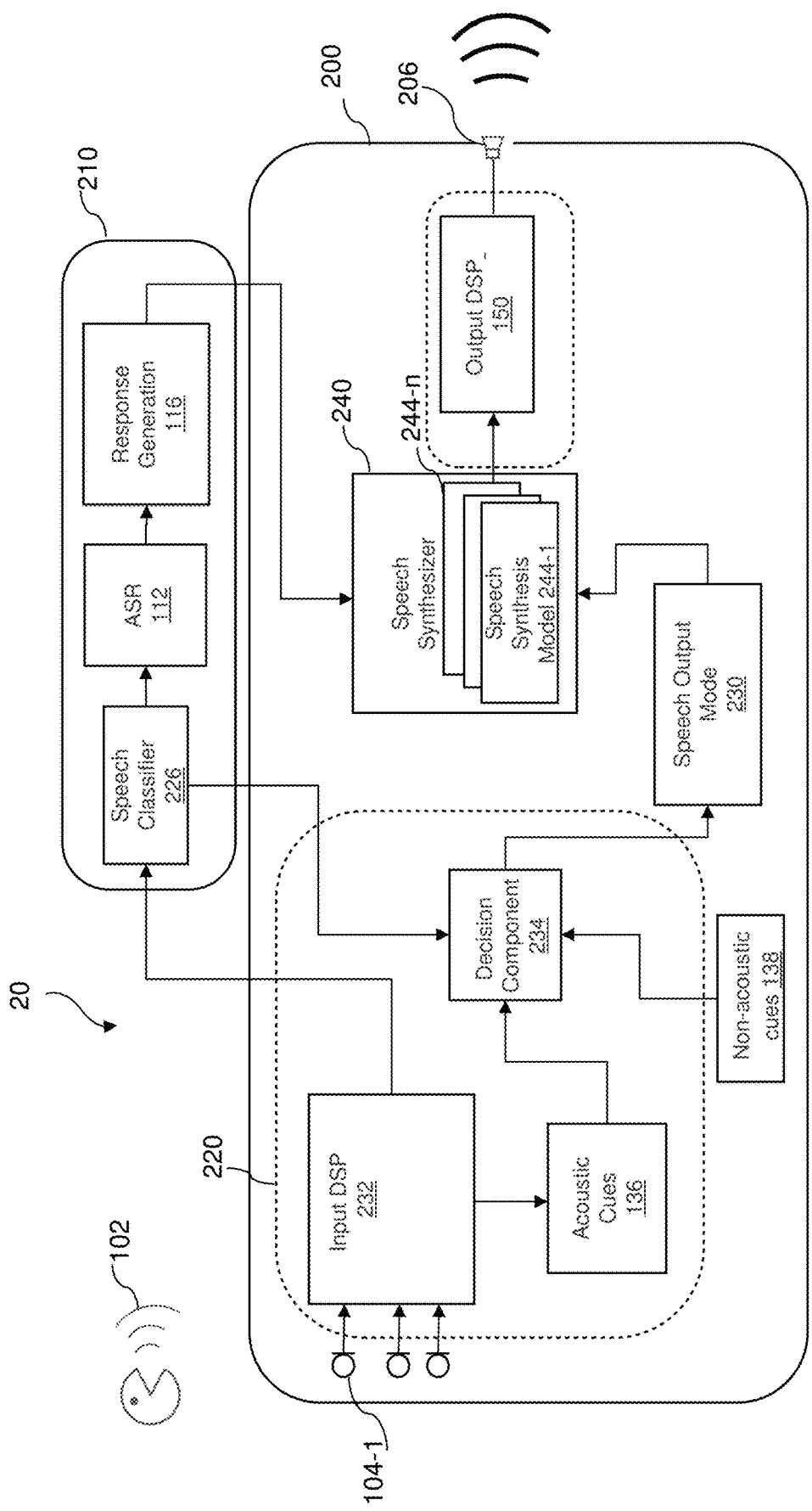
FIG. 2 illustrates a schematic block diagram of a second system for adapting the playback of voice-assistant devices to the environment.

FIG. 2 illustrates an example of a second system 20 for adapting playback of voice-assistant devices to an environment to preserve or improve the intelligibility of synthesized or other played-back speech. The system 20 may include an audio appliance 200, and may be similar in some respects to the system 10 from FIG. 1. For example, the system 20 may also use the output DSP 150. However, where Example 1 selects from different speech synthesis parameters, Example 2 selects from different speech synthesis models. In the system 20, the speech synthesizer 240 may include a plurality of speech synthesis models, e.g., model 244-1, . . . 244-n. The plurality of speech synthesis models may include a speech synthesis model specific to whispered speech, a second speech synthesis model specific to Lombard-effect speech, and a third speech synthesis model specific to normal speech. More, fewer, or different speech synthesis models may be included. For example, there may be a single speech synthesis model that synthesizes all types of speech.

In the system 20, the appliance 200 may include an input unit 220, which may include an activation component as described above (not shown) and an input DSP 232. The input DSP 232 may function similarly to the input DSP 132, for example, by processing, filtering or otherwise conditioning or preparing an acquired representation of ambient sound for a speech recognition task. The processed signal may be provided to a remote ASR 210, which may include a speech classifier 226. The speech classifier 226 may classify the speech as described with respect to the speech classifier 126 (FIG. 1). The speech classifier 226 may classify the speech prior to speech recognition by the ASR 112, or concurrently with the operation of the ASR 112.

A decision component 234 may receive the result of the speech classification directly from the speech classifier 226 or from another component of the ASR system 210. The decision component 234 may use the speech classification, acoustic cues 136 and non-acoustic cues 138 to select a speech output mode 230 according to the speech classification, acoustic cues and non-acoustic cues. For example, selecting a speech output mode 230 may comprise selecting a speech synthesis model 248 corresponding to the speech output mode, rather than a set of speech synthesis parameters. For example, when the decision component 234 determines that the output synthesized speech should be whispered, the decision component 234 may select the speech synthesis model specific to whispered speech. The decision component 234 may provide an indication of the selected speech model to the speech synthesizer 240. As a result, the speech synthesizer may use the selected speech model when it synthesizes speech.

The decision component 234 may also, or alternatively, select a playback volume for played-back speech, e.g., output speech. For example, the decision component 234 may include a neural network component that outputs a volume level based on characteristics of the user's utterance, the acoustic cues, the non-acoustic cues, or a combination thereof. In another example, the decision component 234 may use a mapping or look-up table to select a playback volume level according to one or more of the characteristics of the user's utterance, the acoustic cues, and the non-acoustic cues. The selected playback volume level may be provided to the speech classifier 226 or to the output DSP 150.

Although depicted in FIG. 2 as being on the ASR system 210, in some aspects the speech classifier 226 may be on the appliance 200 instead, as shown, for example, in FIG. 1.

V. Example 3

Figure 3:
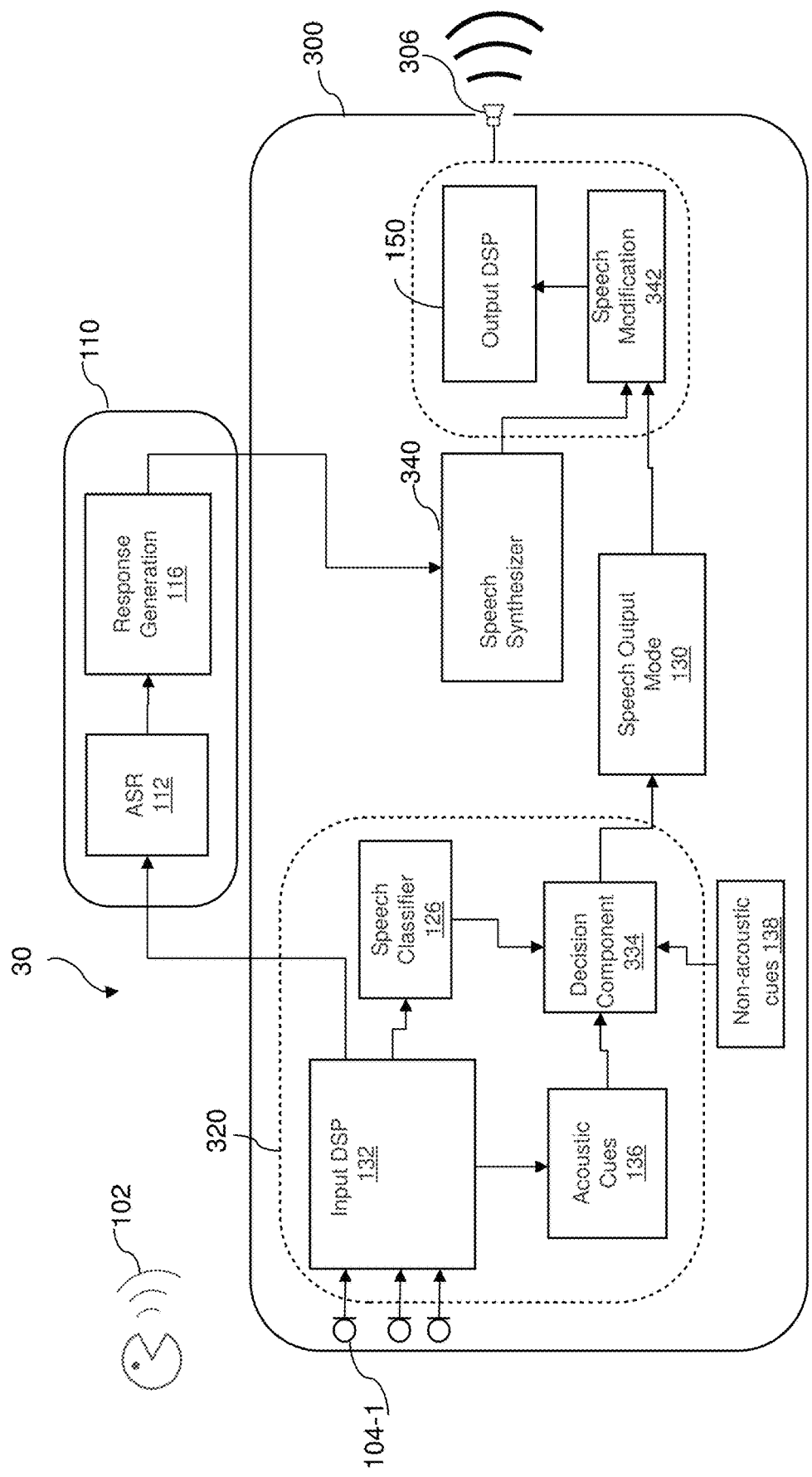
FIG. 3 illustrates a schematic block diagram of a third system for adapting the playback of voice-assistant devices to the environment.

FIG. 3 illustrates an example of a third system 30 for adapting playback of voice-assistant devices to an environment to preserve or improve the intelligibility of synthesized or other played-back speech. The system 30 may include an audio appliance 300 and may be similar to the systems 10 and 20 from FIGS. 1 and 2, respectively. Where Examples 1 and 2 affect how speech is synthesized with respect to a selected speech output mode, in Example 3, synthesized speech is modified according to the speech output mode after being synthesized. For example, the system 30 may also use the input DSP 132, the speech classifier 126, the ASR system 110, and the output DSP 150 as in system 10, or may use the input DSP 232, speech classifier 226, ASR system 210, and output DSP 150 as in system 20.

A speech synthesizer 340 may synthesize speech without input from the decision component 334. In some cases, the speech synthesizer 340 may operate remotely from the audio appliance 300.

Instead, a decision component 334 may select a speech output mode 130. In an aspect, selecting a speech output mode may comprise selecting one or more speech modification parameters according to the speech mode classification, acoustic cues, and non-acoustic cues. The decision component 234 may also, or alternatively, select a playback volume for played-back speech. The selected playback volume, speech modification parameters, or both may be provided to a speech modification component 342. The speech modification component 342 may be configured to receive synthesized speech from the speech synthesizer 340 and to modify the synthesized speech according to the playback volume and/or the selected one or more speech modification parameters. For example, the speech modification parameters may cause the speech modification component 342 to change the spectral tilt of the synthesized speech to correspond to Lombard-effect speech, may remove pitch from the synthesized speech to correspond to whispered speech, may change only the playback volume for a normal speech output mode, or may change playback volume in addition to speech characteristics.

In another aspect, selecting a speech output mode may include indicating to the speech modification component 342 a type (or class) of speech to be output. The speech modification component 342 may then select the speech modification parameters according to the indication of the type of speech to be output.

In an aspect, the speech modification component 342 may divide the synthesized speech into a plurality of frames. Each frame may be classified as being voiced or unvoiced. The spectrum of each voiced frame may then be extracted, for example, by using a discrete Fourier transform. The spectrum in each voiced frame may then be modified using linear predictive coding (LPC) coefficients and the received speech modification parameters. Each modified frame may then be rescaled to the same root mean square (RMS) level as the input synthesized speech. The signal may be reconstructed and input to a dynamic range compressor to compensate for the low level of the speech frames and to compensate for the hearing level of the user.

A decision component, e.g., decision component 134, 234, and/or 334, may use one or more functions, mapping curves, look-up tables or other relationships between its inputs and the playback volume, parameters to select the speech synthesis parameters, modification parameters, or speech model. The values of the various input variables may be inputs for one or more functions, or may map to other values, for example, in a look-up table. FIG. 4 shows a representation of three input variables (Variable 1, Variable 2, and Variable 3) having respective values of $v_1$, $v_2$, and $v_3$. The three variables correspond to a point $P_{env}$ in 3-D space. The variables may represent, for example, the reverberant ratio, the background noise, and the signal to noise ratio. More, fewer, or other variables could be used in a higher-, lower- or same-dimensional space.

The variable values may be input into a function $F(v_1, v_2, \ldots v_n)$, which may operate on the variables to obtain a result. The result may correspond in some way to a speech classification, to a playback volume, or both. Modifications to make to already-synthesized speech may be chosen in correspondence with the speech classification. The result may correspond to a value that maps to a specific speech synthesis model, or to one or more parameters to apply while synthesizing speech. In one example, the different speech modes that can be produced by the system may be represented by a set of bins, with a separate bin for each respective speech mode, e.g., a whisper bin, a normal bin, and a Lombard-effect bin. Each respective bin may be associated with a different range of numeric values, e.g., Range 1, Range 2, and Range 3. The function F( ) may produce a value, and the value may lie within one of the bin ranges. The decision component selects a specific set of speech synthesis parameters, a specific speech synthesis model, or a specific set of modification parameters according to the bin corresponding to the produced value.

The variables in the function F( ) may be weighted with respect to one another. In but one example, a variable that reflects the detected speech mode of the user's utterance may be weighted at 50%, while the remaining variables related to the acoustic and non-acoustic cues may have a combined weight of 50%. This weighting may be used when matching the speech mode of the output synthesized speech to the speech mode classification of the utterance is of higher priority than making the output speech more intelligible in the listening environment, e.g., to make the output whispered speech when the user's utterance is whispered, or to make the output speech be Lombard-effect speech when the user's utterance exhibits the Lombard effect.

In other cases, the variables related to the acoustic and non-acoustic cues may be collectively weighted more than the speech mode variable. This weighting may be used, for example, when making the output speech intelligible in the listening environment is of higher priority than matching the speech mode of the user's utterance. For example, if the user speaks in a normal mode in a loud environment, the output speech may be Lombard-effect speech rather than normal speech.

In still other cases, the variables related to the acoustic cues may be collectively weighted more than the variable related to the non-acoustic cues, or vice versa.

VI. Control Logic

Figure 5:
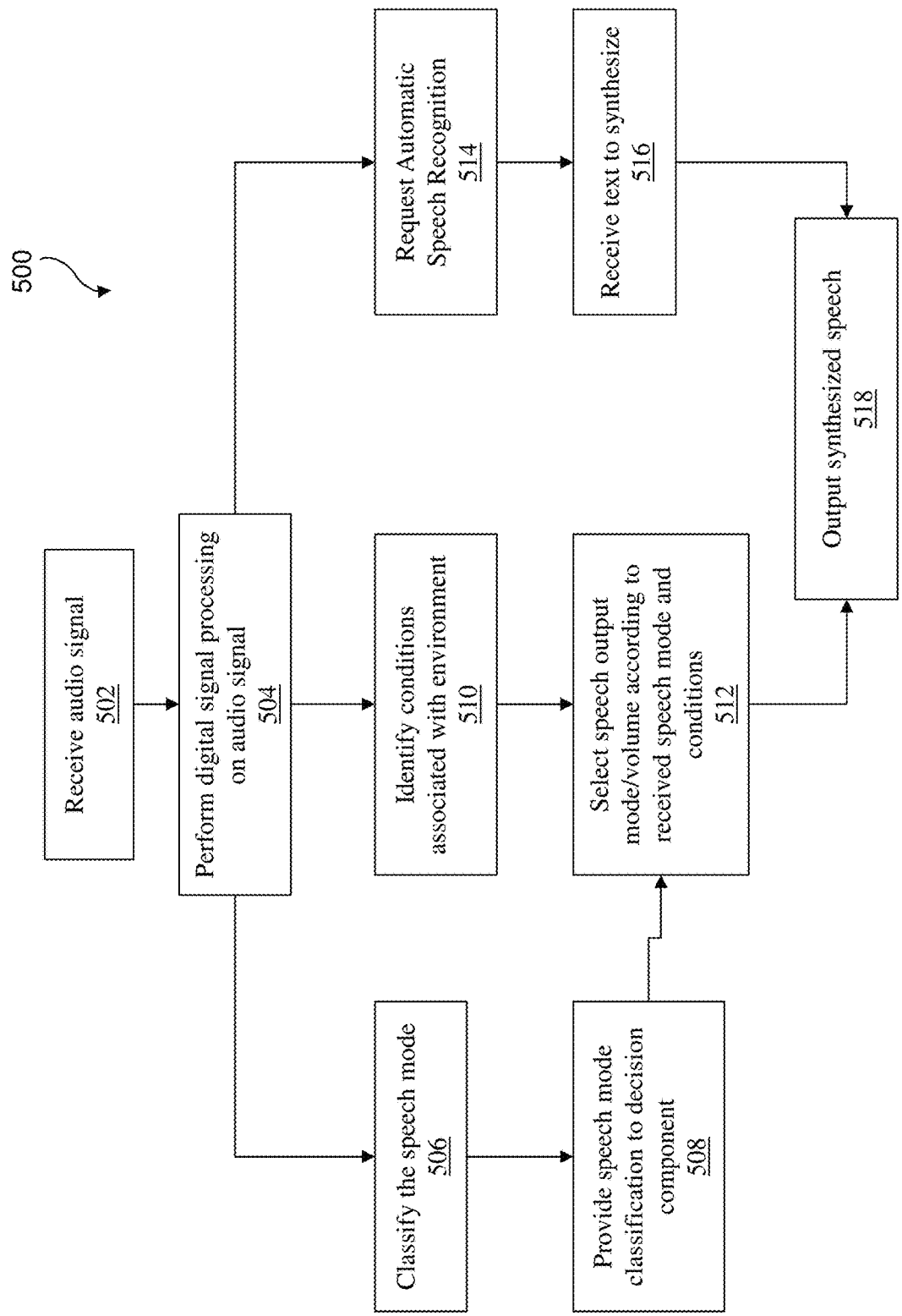
FIG. 5 illustrates an example of control logic as may be used by a system for adapting the playback of voice-assistant devices to the environment.

Referring now to FIG. 5, an example of control logic is described. The illustrated control logic 500 may be performed, for example, by the audio appliance 100, for example, by the input DSP 132, the speech classifier 126, the decision component 134, and the speech synthesizer 140, or by the audio appliance 200, for example, by the input DSP 232, the speech classifier 226, the decision component 234, and speech synthesizer 240. For either the system 10 or the system 20, the illustrated control logic 500 causes the decision component 134, 234 of the respective system to affect how speech is played back as the speech is synthesized, for the audio appliance's current environment. Affecting how the speech is played back may include selecting a playback volume, selecting how the speech is synthesized, or both.

The control logic 500 may receive an audio signal in block 502. The received audio signal may include an utterance, e.g., utterance 102, which may in turn include one or more words, including an uttered command or request. In some aspects, the received audio signal may include one or more utterances. The audio signal may be received by the input DSP (e.g., the input DSP 132 of FIG. 1) from an audio acquisition module and/or from additional microphones 104-2, 104-3.

The control logic 500 may perform digital signal processing on the received audio signal in block 504. For example, the input DSP (e.g., the input DSP 232 of FIG. 2) may process, filter, or otherwise prepare the audio signal(s) for a speech recognition task. For example, the input DSP may remove noise, perform echo cancellation, and remove reverberations from the audio signal(s).

The control logic 500 may classify the utterance according to a speech mode in block 506. For example, the speech classifier (e.g., the speech classifier 126 of FIG. 1) may analyze, extract, measure, or otherwise determine one or more characteristics of the utterance in order to classify a speech mode of the utterance. For example, the speech classifier may classify the speech mode as a whisper mode, a normal mode, or a Lombard-effect mode. In one example, the speech classifier may compare, for example, the pitch of the utterance to a pitch threshold or range, a spectral tilt of the utterance to a spectral tilt threshold or range, and/or an energy content of the utterance to an energy content threshold or range, or use a machine learning system.

The control logic 500 may provide the speech mode classification to the decision component in block 508. For example, the speech classifier (e.g., the speech classifier 226 of FIG. 2) may communicate an indicator of the speech mode (e.g., to be used by the control logic 500 to select a speech synthesis mode at block 512). The indicator may be a number that corresponds to a speech mode or may be a text string that corresponds to a speech mode.

The control logic 500 may identify conditions associated with the environment in block 510. For example, the input DSP (e.g., the input DSP 132 of FIG. 1) may extract from, measure, and/or analyze the audio signal to determine acoustic cues 136, such as a level of background noise, a direct to reverberant ratio, a signal to noise ratio, and an echo coupling residual, and may provide the acoustic cues 136 to the decision component (e.g., the decision component 134 of FIG. 1). In addition, the decision component may request or retrieve non-acoustic cues 138, which identify non-acoustic conditions associated with the environment.

The control logic 500 may select a playback volume, a speech output mode from a plurality of speech output modes, or both, in block 512. For example, the decision component (e.g., the decision component 134 of FIG. 1) may select the speech synthesis parameters 142 according to the conditions associated with the environment and the speech mode (e.g., provided by block 508). Alternatively, the decision component 234 may provide an indication of the playback volume or selected speech output mode. The decision component (e.g., the decision component 234 of FIG. 2) may receive the speech mode from the speech classifier (e.g., speech classifier 226 of FIG. 2), and may select the playback volume, the speech synthesis model 248 (FIG. 2), or both, according to the conditions associated with the environment and the speech mode.

Concurrently, or in parallel, with blocks 506 and 510, the control logic 500 may also request automatic speech recognition on the uttered command or request in block 514. For example, after some processing of the audio signal, the input DSP may request speech recognition on the processed audio signal from the ASR system 110.

The control logic 500 may receive text resulting from the ASR in block 516. For example, the text may correspond to a response to a question, a confirmation that a task was performed, a request from the voice assistant for more information, or other text to be communicated to the user as a result of the ASR operation.

The control logic 500 may output synthesized speech from the text in block 518. For example, in the system 10, the speech synthesizer 140 may temporarily change one or more parameters of the speech synthesis model 144 according to the speech synthesis parameters 142 (or a received indication of a speech output mode) and synthesize the received text into speech according to the speech synthesis model. In the system 20, the speech synthesizer 240 may use the speech synthesis model 244 indicated by the decision component 234 to synthesize speech from the received text. The digital signal processor 150 may process the synthesized speech for output through the loudspeaker 106.

In some aspects, if the decision component 134 or 234 determines that no modifications are needed for output speech, for example, if the speech classification of the utterance is normal and the environment is not noisy, then the decision component may not output any speech synthesis parameters or a selected model at block 512. The decision component may nevertheless modify the playback volume to make the speech comfortable without being too loud or too quiet for the user's environment.

Figure 6:
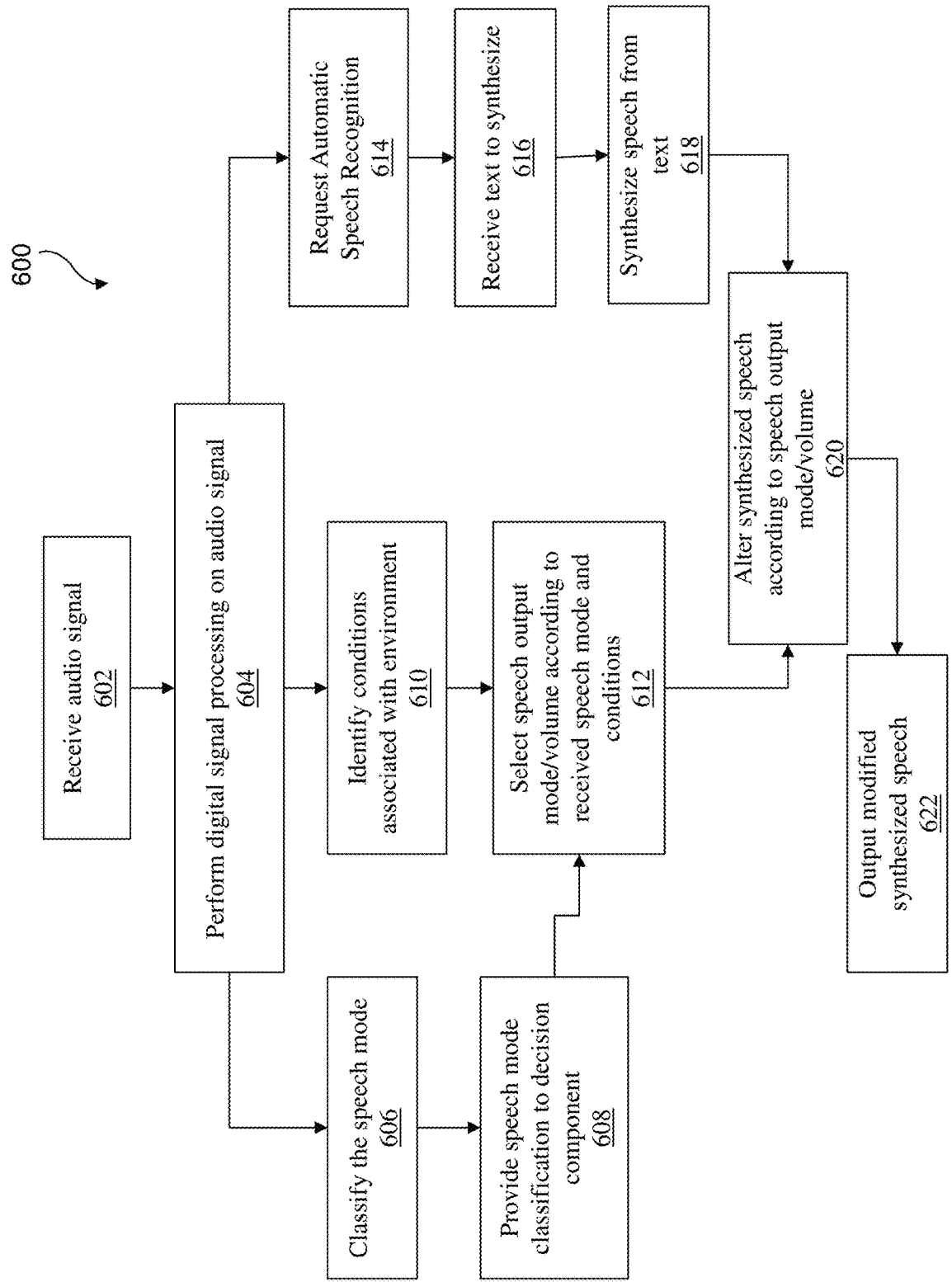
FIG. 6 illustrates an example of control logic as may be used by a system for adapting the playback of voice-assistant devices to the environment.

Referring now to FIG. 6, another example of control logic is described. The illustrated control logic 600 may be performed by the audio appliance 300 (FIG. 3), for example, by the input unit 320, speech synthesizer 340 and speech modification component 342. The illustrated control logic 600 may cause the decision component of the system 30 to affect how already-synthesized speech is level-scaled and/or modified for the audio appliance's current environment.

The control logic 600 may begin similarly to the control logic 600 illustrated in FIG. 5. That is, blocks 602, 604, 606, 608, 610, 614, and 616 may be analogous to blocks 502, 504, 506, 508, 510, 514, and 516 respectively. The control logic 600 may select one or more speech modification parameters in accordance with a speech output mode in block 612. For example, the decision component 334 may select one or more speech modification parameters according to the speech mode classification, and the conditions identified in block 610. Alternatively, the decision component 334 may select a playback volume, a speech output mode from a plurality of speech output modes, or both, according to the speech mode classification, acoustic cues, non-acoustic cues, or a combination thereof.

The control logic 600 may concurrently request speech recognition on the uttered command in the audio signal, in block 614, which may be analogous to block 514. For example, after some processing of the audio signal in block 604, the input DSP 132 may request speech recognition on the processed audio signal from the ASR system 110.

The control logic 600 may receive text to synthesize from the ASR system 110 in block 616. For example, the text may correspond to a response to a question, a confirmation that a task was performed, a request from the voice assistant for more information, or other text to be communicated to the user as a result of the ASR operation.

The control logic 600 may synthesize speech from the received text in block 618. For example, the speech synthesizer 340 may synthesize speech according to a speech synthesis model. The speech synthesis model may be a general-purpose model that produces speech in a normal speech mode according to user settings that select, for example, a gender, an accent, and a language for the synthesized speech.

The control logic 600 may alter the synthesized speech according to the speech modification parameters, the playback volume, or both, in block 620. For example, to produce Lombard-effect from the normal mode synthesized speech, the speech modification parameters may cause the speech modification component 342 to increase the level or energy content at the higher frequencies and decrease the level or energy content in the lower frequencies to reduce the spectral tilt. The speech modification parameters may further cause the speech modification component 342 to slow the speech rate of the synthesized speech, increase the pitch, and increase the level or energy content. In another example, to produce whispered speech from the normal mode synthesized speech, the speech modification parameters may cause the speech modification component 342 to remove the pitch and decrease the level or energy content. In some aspects, the speech modification component 342 may receive an indication of a selected speech output mode, and may select the playback volume, the speech modification parameters, or both, itself.

The control logic 600 may then output the modified synthesized speech in block 622. For example, the digital signal processor 150 may process the modified synthesized speech for output through the loudspeaker 106.

In some aspects, if the decision component 334 determines that no modifications are needed for output speech, for example, if the speech classification of the utterance is normal and the environment is not noisy, then the decision component 334 may output a playback volume modification but may otherwise not output any speech modifications at block 612, and block 620 may be skipped.

VII. Position or Directional Influence on Intelligibility

A position of a noise source relative to a user's position can inform the voice-assistant device's decision of whether or to what extent to modify output speech to improve user-perceived intelligibility of output speech. For example, a voice-assistant device (or other audio appliance) can be configured to discern a direction from which the device receives sound, e.g., noise, as well as a direction from which the device receives audible user input (e.g., a user's utterance). The device can further be configured to compare the relative directions of arrival of noise and user input, and that comparison can inform whether or to what extent the speech output mode can or should be modified from a normal speech output mode in order to improve user-perceived intelligibility of the output speech.

For example, in a scenario where background noise (e.g., from a coffee machine) arrives at the voice-assistant device from one direction (sometimes referred to in the art as a "direction of arrival", or "DOA') and a user speaks from a different DOA relative to the voice-assistant device, the playback level can be adapted in a way to be comfortable and intelligible to the user and not very loud. On the other hand, if the user speaks from the same or close to the same DOA as the background noise, the playback level or other aspect of the output-speech mode can be adjusted, e.g., the level can be increased, to compensate for the background noise level and make the output speech relatively more intelligible. Although the prior sentence refers to level as an example of one characteristic of synthesized output speech that can be adjusted or modified, other characteristics of synthesized output speech can be adjusted or modified according to approaches described herein in an attempt to improve user-perceived intelligibility of output speech.

Stated differently, a voice-assistant device can adapt an output-speech mode (e.g., any one or more characteristics of output speech, including an output level) according to a selected first approach when background noise arrives from a different direction than the direction from which a user's speech arrives. And, the voice-assistant device can adapt the output-speech mode according to a selected second, different approach when the background noise arrives from the same or approximately the same direction from which the user's speech arrives. To illustrate, a voice-assistant device can adapt the output-speech mode according to the second approach when the direction of arrival (DOA) of background noise is less than about 30-degrees different from the DOA of the user's speech, such as, for example, less than about 25-degrees, as when the difference in DOA is less than about 20-degrees. For example, the output-speech mode can be adapted by increasing the output level, incorporating one or more other features of Lombard speech, and combining those adjustments or other adjustments of output-speech characteristics.

In another example, when the difference in DOA is within a first range, e.g., between about 0 and 10 degrees, a voice-assistant device can select a first speech-output mode. Alternatively, when the difference in DOA is within a second range, e.g., between about 10 degrees and about 20 degrees, the voice-assistant device can select a second speech-output mode. By way of further example, when the difference in DOA is within a third-range, e.g., between about 20 degrees and about 30 degrees, the voice-assistant device can select a third speech-output mode. And, when the difference in DOA exceeds an upper threshold difference, e.g., greater than about 30 degrees, the voice-assistant device can select a fourth speech-output mode, e.g., a "normal" speech output mode.

Figure 7:
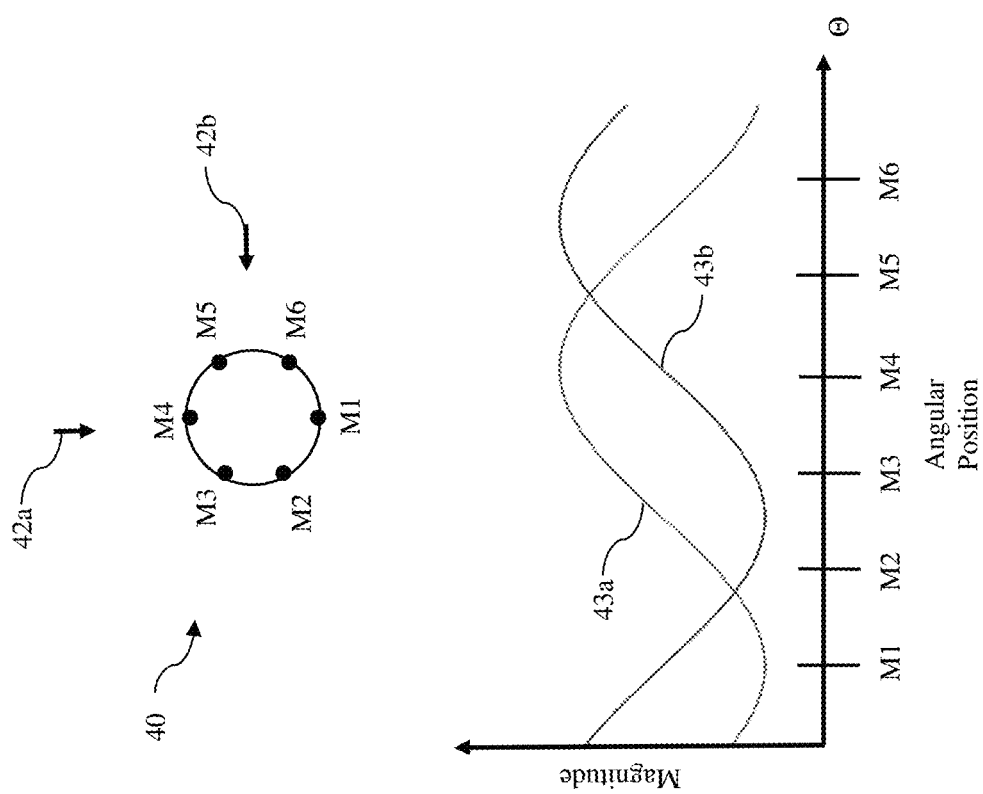
FIG. 7 illustrates a voice-assistant device having a circular array of microphones exposed to sound coming from two directions, together with a plot schematically illustrating a microphone response to the sound from each direction.

As noted above, a voice-assistant device or other audio appliance can discern a direction from which sound (or a component of sound, e.g., background noise, user speech, or a combination thereof) arrives at the device. For example, the voice-assistant device can incorporate a microphone or an array of microphones configured to respond in correspondence with a direction from which sound arrives at the device. Referring now to FIG. 7, a voice-assistant device 40 having a circular array of microphones $M_1, M_2, \ldots, M_6$ is shown. Although a circular array of six microphones is shown, any suitable number of microphones can be used in a microphone array and can be positioned in any suitable arrangement, e.g., in an ovoid arrangement, a planar arrangement, a linear arrangement, or a three-dimension arrangement, e.g., in a cuboid or spheroid arrangement.

Observed acoustic responses by each microphone in the microphone array can be used to determine an orientation of the microphone array relative to incoming sound and components of incoming sound. Thus, so long as the position of the microphone array is known relative to the audio device 40, an orientation of the audio device and its constituent features, e.g., a loudspeaker array, also can be determined.

For ease of illustration, the arrows 42a and 42b represent a first sound component and a second sound component, respectively, arriving from different directions. In the orientation of the array 40 shown in FIG. 5, the microphone $M_1$ receives the least acoustic energy from the first sound component 42a, and the microphone $M_4$ receives the most acoustic energy from the first sound component 42a (assuming the sound component 42a arrives at the device 40 as a plane wave). The second sound component 42b in this example arrives at the device 40 from a direction approximately orthogonal to the first sound component 42a. Assuming the sound component 42b arrives at the device 40 as a plane wave, the point of least-incident acoustic energy from the second sound component 42b is positioned between microphones $M_2$ and $M_3$, and the point of highest-incident acoustic energy from the second sound component 42b is positioned between microphones $M_5$ and $M_6$.

More generally, one or more components of incoming sound can be identified, characterized or extracted from sound observed by the microphone array. For example, voiced and unvoiced utterances can be detected in a sound field and isolated from noise or other sound components. A measure of incident acoustic energy corresponding to each sound component can be determined, or estimated, for each microphone $M_1, M_2, \ldots, M_6$ in the microphone array "looking into the room." For example, a voice-assistant device 10 can compute a difference in the frequency response observed by each respective microphone $M_1, M_2, \ldots, M_6$ in the microphone array. As well, a magnitude of each difference in frequency response, each corresponding to a respective one of the microphone positions around a longitudinal axis extending into the page in FIG. 7 can be computed across a selected frequency band, e.g., in a mid-range band typical of human speech (e.g., voiced and unvoiced utterances).

Since each external microphone is spatially separated with respect to the others, the calculated difference in frequency response (or other measure of incident energy) associated with each microphone may be different than the calculated difference in frequency response (or other measure of incident energy) associated with the other microphones.

The plots 43a, 43b shown in FIG. 7 graphically depict representative magnitudes of incident acoustic energy computed at each microphone $M_1, M_2, \ldots, M_6$ in the microphone array 40 for the first sound component 42a and the second sound component 42b, respectively. As shown by the plot 42a, the magnitude of the radiation impedance is smallest at the microphone $M_1$ and largest at the microphone $M_4$. Similarly, the plot 42b depicts a largest radiation impedance between microphones $M_5$ and $M_6$ and a least radiation impedance between microphones $M_2$ and $M_3$.

Consequently, a direction-of-arrival for each incoming component of sound can be estimated using the foregoing information. For example, the position of each microphone $M_1, M_2, \ldots, M_6$ in the microphone array relative to the longitudinal axis can represent an angular coordinate in an r-Θ plane defined by the circular microphone array 40.

And, recognizing that the magnitude of incident acoustic energy for a sound component associated with or representative of human speech reaches a maximum in a direction from which the sound component originates (e.g., a position of the person speaking), an orientation of the microphone array 40 (and thus the orientation of the corresponding voice-assistant device) relative to person speaking can be ascertained by determining an angular position of the maximum incident acoustic energy (e.g., from the plot shown in FIG. 7). With that direction estimate, the voice-assistant device can affect a mode of device operation.

For example, the device can render output speech in a selected manner, e.g., select a suitable speech-output mode as described herein in an attempt to improve user-perceived intelligibility of the output speech, render output speech in a direction toward the person speaking, or both.

Accordingly, a desired speech-output mode, or other mode of operation, can be determined automatically without interruption to the user, while still allowing the user to reposition the audio device and/or to move throughout a listening environment. Such an audio device can avoid inconvenience to a user and improve the overall listening experience to a user.

VIII. Computing Environments

Figure 8:
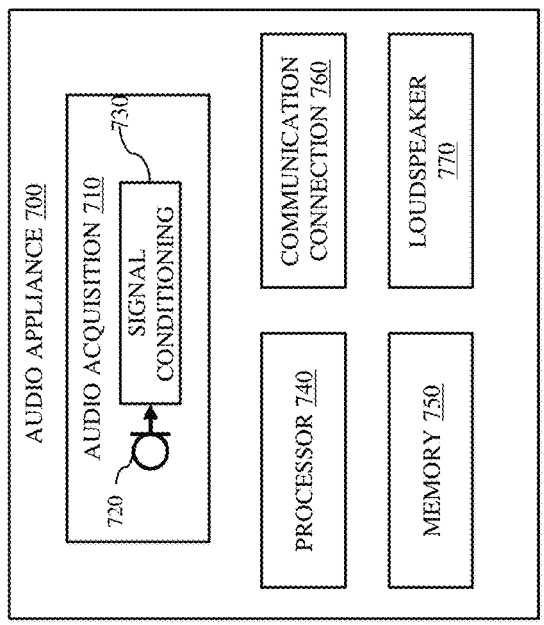
FIG. 8 illustrates a block diagram showing aspects of an audio appliance.

FIG. 8 shows an example of a suitable architecture for an audio appliance that can carry out one or more tasks responsive to commands uttered by a user or other information within an ambient sound field. The audio appliance 700 may be a generalized representation of the audio appliances 10, 20, and/or 30. The audio appliance 700 includes an audio acquisition module 710, which may be an example of the AAM 122. The audio appliance 700 also includes aspects of a computing environment (e.g., described more fully below in connection with FIG. 8) that can cause the appliance to respond to an acoustic scene in a defined manner. For example, the illustrated appliance 700 includes a processing unit 740 and a memory 750 that contains instructions the processing unit can execute to cause the audio appliance to, e.g., carry out one or more aspects of acquiring ambient sound, extracting information from the acquired sound, and providing the functionality of the input unit 120, and/or the speech synthesizer 140.

For example, such instructions can cause the audio appliance 700 to capture ambient sound with the audio acquisition module 710 and to communicate some or all of an acquired audio signal over a communication connection 760 to a remote speech-recognition system (not shown). The captured ambient sound could include a user's uttered command, such as, for example, "Hey, Siri. Play the song [Title]." By way of further example, the speech-recognition system can extract such an uttered command from the audio signal and communicate a machine-readable command to the audio appliance 700 over the communication connection 760. The command can invoke an audio codec (not shown) and/or other instructions to cause the audio appliance to play the song over a loudspeaker 770, as requested by the user.

Referring still to FIG. 8, an audio appliance typically includes a microphone transducer to convert incident acoustic signals to corresponding electrical output. As used herein, the terms "microphone" and "microphone transducer" are used interchangeably and mean an acoustic-to-electric transducer or sensor that converts an incident acoustic signal, or sound, into a corresponding electrical signal representative of the incident acoustic signal. Typically, the electrical signal output by the microphone is an analog signal.

Although a single microphone is depicted in FIG. 8, the use of plural microphones is contemplated by this disclosure, e.g., microphones 104-1, 104-2, and 104-3. For example, plural microphones can be used to obtain plural distinct acoustic signals emanating from a given acoustic scene, and the plural versions can be processed independently and/or combined with one or more other versions before further processing by the audio appliance 700.

As shown in FIG. 8, the audio acquisition module 710 can include a microphone transducer 720 and a signal conditioner 730 to filter or otherwise condition the acquired representation of ambient sound. Some audio appliances have an analog microphone transducer and a pre-amplifier to condition the signal from the microphone.

Output from the pre-amplifier or other conditioner can be low-pass filtered before being sampled by an analog-to-digital converter (ADC), though the output need not be low-pass filtered prior to sampling. In some instances, the ADC can employ Sigma-Delta modulation, followed by a decimation filter to down-sample the digital signal.

For example, an analog output from the microphone transducer 720 can be low-pass filtered and subsequently sampled at or above a Nyquist frequency (i.e., twice the highest frequency component in the underlying signal to be sampled) relative to a selected passband, e.g., having an upper-frequency threshold corresponding to human hearing, to generate a stream of acoustic data corresponding to the analog audio signal acquired by the microphone 720. Assuming ambient sounds of interest have an upper threshold frequency of about 20 kHz, a sampling frequency above about 40 kHz can accurately capture an acoustic scene of interest.

Figure 9:
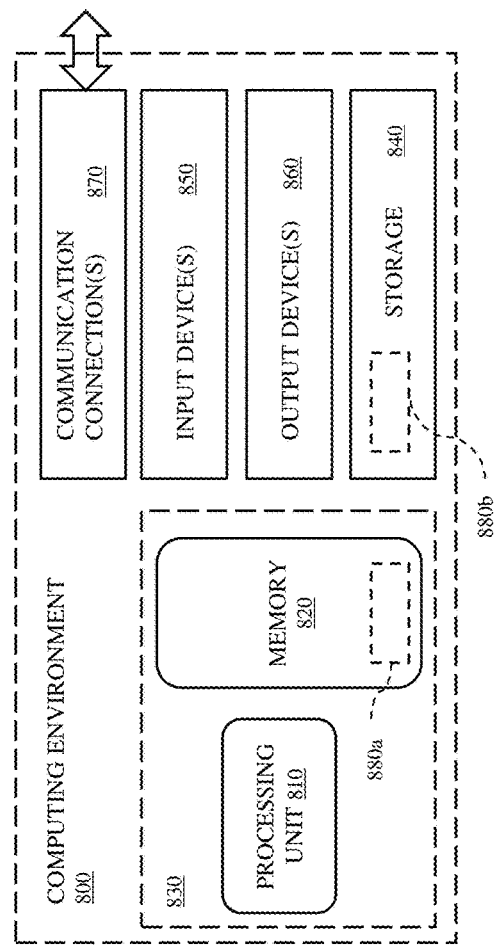
FIG. 9 illustrates a block diagram of a computing environment suitable for implementing disclosed methods or control logic.

FIG. 9 illustrates a generalized example of a suitable computing environment 800 in which described methods, aspects, techniques, and technologies relating, for example, to maintaining a temperature of a logic component and/or a power unit below a threshold temperature can be implemented. The computing environment 800 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and/or handheld devices (e.g., a mobile-communications device, and more particularly but not exclusively, IPHONE®/IPAD®/HomePod™ devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 800 includes at least one central processing unit 810 and a memory 820. In FIG. 9, this most basic configuration 830 is included within a dashed line. The central processing unit 810 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 810 being represented by a single functional block. A processing unit can include an application specific integrated circuit (ASIC), a general-purpose microprocessor, a field-programmable gate array (FPGA), a digital signal controller, or a set of hardware logic structures arranged to process instructions.

The memory 820 may be volatile memory (e.g., registers, cache, RAM), non-volatile memory (e.g., ROM, EEPROM, flash memory, etc.), or some combination of the two. The memory 820 stores software 880a that can, for example, implement one or more of the technologies described herein, when executed by a processor.

A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The store 840 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 800. The storage 840 can store instructions for the software 880b, which can implement technologies described herein.

The store 840 can also be distributed over a network so that software instructions are stored and executed in a distributed fashion. In other aspects, some of these operations might be performed by specific hardware components that contain hardwired logic. Those operations might alternatively be performed by any combination of programmed data processing components and fixed hardwired circuit components.

The input device(s) 850 may be any one or more of the following: a touch input device, such as a keyboard, keypad, mouse, pen, touchscreen, touch pad, or trackball; a voice input device, such as a microphone transducer, speech-recognition software and processors; a scanning device; or another device, that provides input to the computing environment 800. For audio, the input device(s) 850 may include a microphone or other transducer (e.g., a sound card or similar device that accepts audio input in analog or digital form), or a computer-readable media reader that provides audio samples to the computing environment 800.

The output device(s) 860 may be any one or more of a display, printer, loudspeaker transducer, DVD-writer, or another device that provides output from the computing environment 800.

The communication connection(s) 870 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 800. By way of example, and not limitation, with the computing environment 800, machine-readable media include memory 820, storage 840, communication media (not shown), and combinations of any of the above. Tangible machine-readable (or computer-readable) media exclude transitory signals.

As explained above, some disclosed principles can be embodied in a tangible, non-transitory machine-readable medium (such as microelectronic memory) having stored thereon instructions. The instructions can program one or more data processing components (generically referred to here as a "processor") to perform a processing operations described above, including estimating, computing, calculating, measuring, adjusting, sensing, measuring, filtering, addition, subtraction, inversion, comparisons, and decision making (such as by the decision component). In other aspects, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

VIII. Other Aspects

The examples described above generally concern apparatus, methods, and related systems to adapt playback of voice-assistant devices, improve the user's experience, as by making speech more intelligible and adequate for each specific environment. More particularly, but not exclusively, disclosed principles pertain to systems, methods, and components to adapt speech playback in voice-assistant devices, as to improve intelligibility of synthesized speech either during or after synthesis, according to conditions of the listening environment and a speech mode of the user.

Nonetheless, the previous description is provided to enable a person skilled in the art to make or use the disclosed principles. Aspects other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, in some cases, aspects of the audio appliance may receive a voiced utterance from the user that indicates that the output synthesized speech was not heard or was not understood, e.g., the user might say "repeat that", or "I didn't understand that". When the user's utterance is processed by the ASR system and the voice assistant application, the ASR system or the voice assistant application may, prior to repeating the output of the played-back speech, including synthesized speech, indicate to the decision component that an adjustment to the played-back speech is needed to improve intelligibility. The decision component may adjust a playback volume, the speech synthesis parameters, select a different speech synthesis model, and/or adjust the speech modification parameters in response to the indication. The previously synthesized text may be re-synthesized, or may be modified with the adjusted parameters and then output.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

As described above, one aspect of the present technology is the gathering and use of data available from various sources to respond to user requests and commands with intelligible synthesized speech. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide requested information or to perform tasks for the user, and to convey the requested information or information related to performance of the task with intelligible synthesized speech. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of voice assistant application services, the present technology can be configured to allow users to select to "opt in" or "opt out" of participation in the collection of personal information data during registration for services or anytime thereafter. In another example, users can select not to provide location-associated data or acoustic cues for speech intelligibility improvement services. In yet another example, users can select to limit the length of time location-associated data or acoustic cues are maintained or entirely prohibit the development of an acoustic profile for a location. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data. For example, requests may be responded to and tasks may be performed by inferring preferences based on non-personal information data or a bare minimum amount of personal information, such as the content being requested by the device associated with a user, other non-personal information available to the voice assistant application services, or publicly available information.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated aspects. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary aspects disclosed herein can be adapted to various configurations and/or uses without departing from the disclosed principles. Applying the principles disclosed herein, it is possible to provide a wide variety of principles related to improving intelligibility of synthesized speech according to conditions associated with a listening environment, and related methods and systems to improve intelligibility of synthesized speech in accordance with conditions in a listening environment and a user's speech mode. For example, the principles described above in connection with any particular example can be combined with the principles described in connection with another example described herein. Thus, all structural and functional equivalents to the features and method acts of the various aspects described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of principles related to improving intelligibility of synthesized speech according to conditions associated with a listening environment, and related methods and systems that can be devised using the various concepts described herein.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the aspects shown herein, but are to be accorded the full scope consistent with the language of the claims, wherein reference to a feature in the singular, such as by use of the article "a" or "an" is not intended to mean "one and only one" unless specifically so stated, but rather "one or more".

Further, in view of the many possible aspects to which the disclosed principles can be applied, we reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

We currently claim:

1. An appliance comprising a microphone transducer, a processor, and a memory storing instructions that, when executed by the processor, cause the appliance to:
   receive an audio signal at the microphone transducer;
   detect an utterance in the audio signal;
   classify a speech mode based on the utterance;
   determine one or more cues, wherein each cue corresponds to a condition of an environment of the appliance;
   determine a speech output mode based on the classification, a first weight corresponding to the classification, the one or more cues, and a second weight corresponding to the one or more cues, the second weight and the first weight configured to weight the one or more cues more heavily than the classification; and
   output synthesized speech according to the determined speech output mode.

2. The appliance of claim 1, wherein instructions that cause the appliance to classify the speech mode comprise instructions that cause the appliance to classify the utterance according to at least one of: a pitch, number of formants, spectral tilt, speech rate, direction of arrival and energy content.

3. The appliance of claim 2, wherein the instructions cause the appliance to classify the speech mode of the utterance as a whisper mode, a normal mode, or a Lombard effect mode according to one or more characteristics of the utterance.

4. The appliance of claim 3, wherein the one or more characteristics of the utterance comprise at least one of: a pitch, an energy content, a number of formant, a spectral tilt, a speech rate, or a combination thereof.

5. The appliance of claim 1, further comprising instructions that, when executed by the processor, cause the appliance to select a playback volume according to the classified speech mode, the one or more cues, or a combination thereof, and to output the synthesized speech at the selected playback volume.

6. The appliance of claim 1, wherein the instructions to select a speech output mode further comprise instructions to select one or more speech synthesis parameters, the memory further comprising instructions that, when executed by the processor, cause the appliance to: generate synthesized speech according to a speech synthesis model and the selected one or more speech synthesis parameters.

7. The appliance of claim 1, wherein the instructions to select a speech output mode further comprise instructions to select a speech synthesis model from a plurality of speech synthesis models, the memory further comprising instructions that, when executed by the processor, cause the appliance to generate synthesized speech according to the selected speech synthesis model.

8. The appliance of claim 1, wherein the instructions to select a speech output mode further comprise instructions to select one or more speech modification parameters based on the classified speech mode, and the one or more cues; and the memory further comprising instructions that, when executed by the processor, cause the appliance to modify synthesized speech according to the one or more speech modification parameters and to output the modified synthesized speech.

9. The appliance of claim 1, wherein selected speech output mode corresponds to a different speech mode than the speech mode of the utterance.

10. The appliance of claim 1, wherein the instructions to determine one or more cues comprise instructions to determine one or more acoustic cues from the audio signal, the one or more acoustic cues comprising at least one of: background noise received by the microphone transducer, a direct to reverberant ratio, a signal to noise ratio, an echo coupling residual, a distance to a speaker of the utterance, a quality measure of the utterance, or a combination thereof.

11. The appliance of claim 1, wherein the instructions to determine one or more cues comprise instructions to determine one or more non-acoustic cues comprising at least one of: a time of day, a location type, an appliance mode, a user profile, a location layout, an acoustic profile of a location, or a combination thereof.

12. The appliance of claim 1, wherein the instructions that cause the appliance to output the synthesized speech comprise instructions to process synthesized speech for output by a loudspeaker.

13. The appliance of claim 1, further comprising instructions that, when executed by the processor, cause the appliance to receive the audio signal from the microphone transducer, process the audio signal, request speech recognition on the processed audio signal, and receive text, wherein the received text corresponds to a response generated based on recognized speech.

14. The appliance of claim 1, wherein the speech output mode includes at least one of a pitch, a rate, an energy, or a spectral tilt selected for intelligibility in at least one of the conditions of the environment of the appliance.

15. An audio appliance, comprising:
an audio acquisition module, comprising a microphone transducer, configured to receive sound;
a speech classifier configured to detect an utterance in the sound and to classify a speech mode based on the utterance;
a decision component configured to determine one or more cues, each cue corresponding to an observed condition of an environment of the audio appliance, and to select a speech output mode from a plurality of speech output modes based on the classification of the speech mode, a first weight corresponding to the classification, the one or more cues, and a second weight corresponding to the one or more cues, the second weight and the first weight configured to weight the one or more cues more heavily than the classification; and
an output component configured to output synthesized speech according to the speech output mode.

16. The audio appliance of claim 15, further comprising:
a speech synthesizer comprising a speech synthesis model, and configured to receive text and to generate synthesized speech from the text with the speech synthesis model according to the speech output mode.

17. The audio appliance of claim 16, wherein the decision component is configured to select one or more speech synthesis parameters corresponding to the speech output mode, and wherein the speech synthesizer is configured to generate the synthesized speech according to the speech synthesis model and the selected one or more speech synthesis parameters.

18. The audio appliance of claim 16, wherein the decision component is configured to select a speech synthesis model from a plurality of speech synthesis models corresponding to the speech output mode, and wherein the speech synthesizer is configured to generate the synthesized speech according to the selected speech synthesis model.

19. The audio appliance of claim 15, wherein the decision component is configured to select a playback volume, one or more speech modification parameters, or both, corresponding to the speech output mode, the audio appliance further comprising a speech modification component configured to modify synthesized speech according to the playback volume, the selected one or more speech modification parameters, or both, prior to outputting the modified synthesized speech.

20. The audio appliance of claim 15, wherein the speech classifier is configured to classify the utterance as a whisper mode, a normal mode, or a Lombard-effect mode according to at least one of a pitch, a number of formants, spectral tilt, speech rate, energy content.

21. A method for improving intelligibility of synthesized speech comprising:
receiving, at a microphone transducer of an appliance, an audio signal;
detecting an utterance in the audio signal;
classifying a speech mode of the utterance;
determining one or more cues, wherein each cue corresponds to a condition of an environment of the appliance;
determining a speech output mode based on the classification, a first weight corresponding to the classification, the one or more cues, and a second weight corresponding to the one or more cues, the second weight and the first weight configured to weight the one or more cues more heavily than the classified speech mode; and
outputting synthesized speech according to the speech output mode.

22. The method of claim 21, wherein the determining the speech output mode further comprises selecting a playback volume according to the classified speech mode, the condition associated with the environment, or a combination thereof, and outputting the synthesized speech at the selected playback volume.

23. The method of claim 21, wherein the classifying the speech mode of the utterance further comprises classifying the utterance as a whisper mode, a normal mode, or a Lombard-effect mode according to at least one of a pitch, a number of formants, spectral tilt, speech rate, energy content.

24. The method of claim 21, wherein the determining the speech output mode comprises selecting one or more speech synthesis parameters, the method further comprising generating synthesized speech according to a speech synthesis model and the selected one or more speech synthesis parameters.

25. The method of claim 21, wherein the determining the speech output mode comprises selecting a speech synthesis model from a plurality of speech synthesis models, the method further comprising generating synthesized speech according to the selected speech synthesis model.

26. The method of claim 21, wherein the determining the speech output mode comprises selecting one or more speech modification parameters based on the classified speech mode, and one or more cues, the method further comprising modifying synthesized speech according to the selected one or more speech modification parameters and to output the modified synthesized speech.

\* \* \* \* \*